United States Patent [19]

Weber

[11] 4,059,185
[45] Nov. 22, 1977

[54] APPARATUS FOR SUPPLYING SPINNING PREPARATORY MACHINES WITH CANS OR THE LIKE

[75] Inventor: Kurt Weber, Elgg, Switzerland

[73] Assignee: Rieter Machine Works, Ltd., Winterthur, Switzerland

[21] Appl. No.: 638,922

[22] Filed: Dec. 8, 1975

[30] Foreign Application Priority Data

Dec. 24, 1974 Switzerland .................. 17268/74

[51] Int. Cl.² .......................................... B23Q 7/00
[52] U.S. Cl. ............................... 198/339; 19/159 A; 141/170
[58] Field of Search ............... 198/339, 347, 575, 576, 198/433, 449; 19/159 A; 141/168, 169, 170

[56] References Cited

U.S. PATENT DOCUMENTS

| 1,053,631 | 2/1913 | Mulholland | 198/433 |
| 3,235,056 | 2/1966 | Mouche et al. | 198/346 |
| 3,443,287 | 5/1969 | Hertzsch | 19/159 A |

Primary Examiner—Evon C. Blunk
Assistant Examiner—Douglas D. Watts
Attorney, Agent, or Firm—Werner W. Kleeman

[57] ABSTRACT

An apparatus for supplying or charging a spinning preparatory machine with cans transported on transporting trolleys and moving to and from a can filling position of the spinning preparatory machine. There is provided a revolving can transporting device which is driven incrementally or stepwise and which contains a plurality of essentially equally spaced can entrainment members for entraining or engaging empty cans placed upon the transporting trolleys and for moving such cans into the spinning preparatory machine where the empty cans are filled and for moving the refilled cans back onto a transporting trolley. Further there is provided a trolley shifting device which can be moved substantially at right angles to, and outside the path of, the can transporting device, the trolley shifting device being movable in coordinated stepped sequence to the movement of the revolving can transporting device.

4 Claims, 3 Drawing Figures

APPARATUS FOR SUPPLYING SPINNING PREPARATORY MACHINES WITH CANS OR THE LIKE

BACKGROUND OF THE INVENTION

The present invention relates to a new and improved construction of apparatus for supplying or charging spinning preparatory machines with cans or the like.

Modern day spinning machines of high production capacity require efficient techniques for supplying the material which is to be processed. Attempts have been made to more rationally solve the problems of transporting and supplying the fibrous material which is to be processed and to automate these operations as far as possible.

In German Pat. No. 1,266,672, corresponding to U.S. Pat. No. 3,443,287, there is taught to the art an apparatus wherein empty cans are transported upon transporting trolleys laterally to a drawframe, and individual cans, or also pairs of cans, are pushed by a first pushing or pusher device into the drawframe where they are filled with fiber sliver and from which location they are subsequently pushed by a second pusher or pushing device onto an empty transporting trolley held in a preparatory state. As soon as a trolley is fully loaded with cans, then it is manually removed and a new trolley with empty cans is brought into a preparatory position while the empty trolley is dragged around the machine from the can input or infeed side to the can output or delivery side by means of a transporting cable provided at the machine frame base.

When using this state-of-the-art apparatus the procedure which must be employed is cumbersome inasmuch as each time that a transporting trolley is emptied or filled, respectively, a new trolley must be placed at the can input side and a trolley filled with full cans must be transported away from the can output side by the operator. This apparatus therefore is not suitable for automated operation.

Another prior art device for exchanging cans at spinning preparatory machines has been disclosed in German patent publication No. 1,172,997 wherein such device is mounted at a two-head drawframe and comprises a transporting belt or a transporting trolley for transporting the cans to the drawframe and a pusher rod which pushes two empty cans from the transporting belt or from the transporting trolley, respectively, into the drawframe where such cans are filled.

As the cans are filled the drawframe is brought to stand-still and the cans are pushed back along the same path onto the transporting belt or onto the transporting trolley, as the case may be. Such transporting belt or transporting trolley is then subsequently moved through a distance corresponding to the diameter of two filled cans in a manner such that two empty cans are again positioned in front of the drawframe and can be inserted by the pusher rod into the drawframe.

This can exchange device achieves a continuous can transport or feed to and from a position in front of the drawframe, but the cans, however, are not continuously transported to and from the filling positions. The application of this device at modern day drawframes operating at high speeds and with high production capacities is not feasible inasmuch as the drawframes must be brought to standstill each time that a can is filled.

SUMMARY OF THE INVENTION

Therefore, with the foregoing in mind it is a primary object of the present invention to provide a new and improved construction of apparatus for supplying spinning preparatory machines with cans or the like in a manner not associated with the aforementioned drawbacks and limitations of the prior art proposals.

Another and more specific object of the present invention aims at eliminating the disadvantages of the state-of-the-art equipment and to create an apparatus for continuously transporting empty cans from a transporting device to a spinning preparatory machine, such as for instance a drawframe, up to the filling position, and upon filling of the cans transporting each of the full cans back onto the transporting device in a manner such that manual work is maintained at a minimum, while realizing optimum functional reliability of the apparatus and eliminating production downtimes.

Still a further significant object of the present invention aims at the provision of a new and improved construction of apparatus for reliably and positively supplying a filling station with cans or the like in a manner avoiding any interruption in the can filling operation, thereby improving the economies of the equipment and insuring for continuous supply of the cans to a processing station where the contents thereof can be processed.

Now in order to implement these and still further objects of the invention, which will become more readily apparent as the description proceeds, the invention contemplates the provision of a revolving can transporting device driven in steps or increments and comprising a plurality of can entrainment members arranged at essentially uniform spacing from one another. The can entrainment members serve to engage or take-up empty cans placed upon the transporting trolleys and to insert such cans into the spinning preparatory machine as well as to move the cans back onto a transporting trolley. Further, there is provided a trolley transporting device which can be moved at right angles to, and outside the path of, the can transporting device, the trolley transporting device being driven in coordinated stepped sequence to the movement of the incrementally revolving can transporting device.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
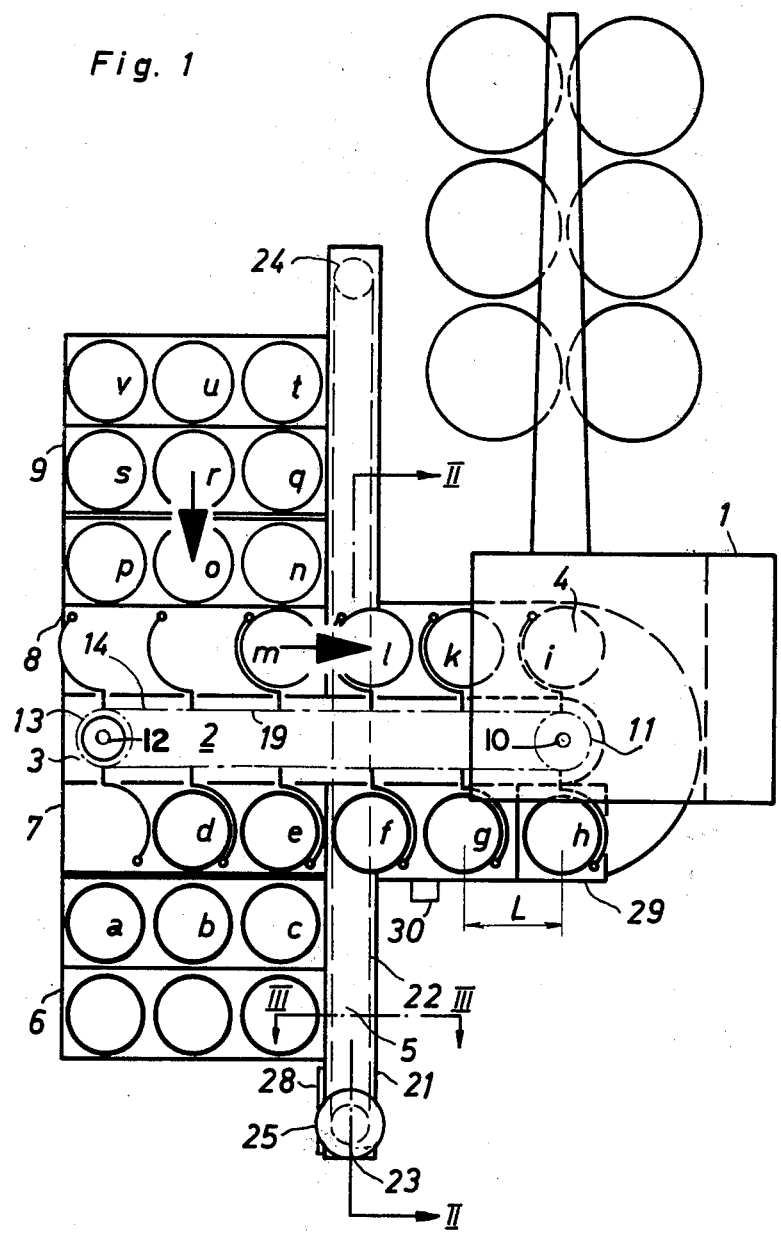
FIG. 1 is a top plan view of an apparatus for supplying cans or the like to a spinning preparatory machine as contemplated by the invention.

Turning attention now to the drawings, it is to be understood that only enough of the apparatus for charging or supplying cans to a spinning preparatory machine has been shown in the drawings to enable those versed in the art to fully understand the underlying concepts and principles of the invention. A complete system for transporting empty cans from a spinning machine where the cans are emptied to a spinning preparatory machine for refilling the cans constitutes subject matter of my copending United States application Ser. No. 638,921, filed Dec. 8, 1975, and entitled "Method Of Loading Transporting Trolleys With Full Cans Or The Like And Supplying Full Cans To Spinning Machines Fed With Fiber Sliver And Apparatus For Implementing The Method", to which reference may be readily had and the disclosure of which is incorporated herein by reference. Turning attention to FIG. 1 it is to be understood that at a spinning preparatory machine, for instance a drawframe 1, there is provided a supplying or charging device 2 constructed according to the teachings of the present invention. As equally seen by referring to FIG. 1 the supplying or charging device 2 embodies a supporting or support structure 3. Support structure 3 extends with its end confronting the machine below a filling position or station 4 in the drawframe 1. The supplying device 2 is supported at its central region upon a displacement or shifting device 5 for the transporting trolleys, such as the trolleys 6, 7, 8 and 9. The end of the supporting structure 3 opposite the drawframe 1 is of cantilevered construction and extends above transporting trolley 7 which is in contact with the trolley shifting or displacement device 5. The further illustrated transporting trolleys 6, 8 and 9 are placed side by side along the shifting device 5, as shown.

Figure 2:
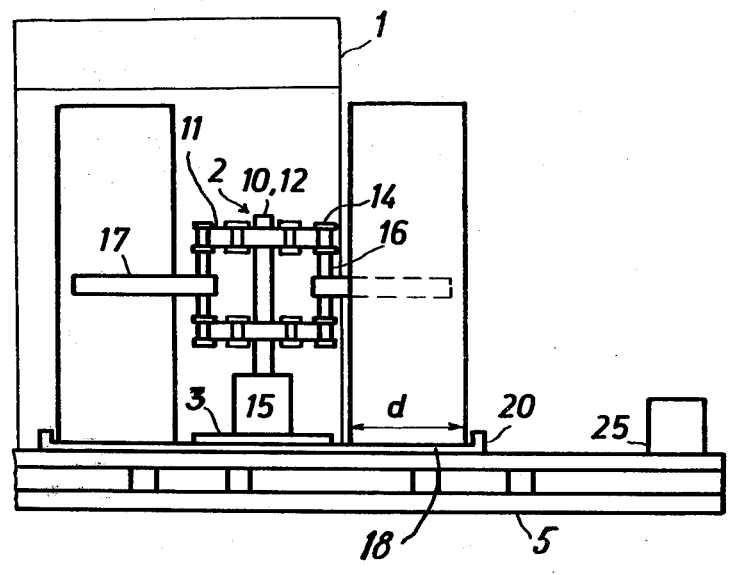
FIG. 2 is a sectional view of the apparatus shown in FIG. 1, taken along the line II—II thereof.

The elements or components of the supplying device 2 are mounted upon the supporting structure 3. At the end of the supporting structure 3 facing the spinning preparatory machine 1 a pair of chain sprocket wheels or gears 11 are mounted in spaced relationship from one another upon a vertical shaft 10 and at the other end of such supporting structure 3 a further pair of chain sprocket wheels or gears 13 are mounted in spaced relationship from one another upon a shaft 12 (FIG. 2). A pair of chains 14 are trained about the pairs of sprocket wheels 11 and 13 and such chains are driven in stepwise increments i.e. indexed by means of a suitable drive motor 15 cooperating with the driven shaft 12. Of course, instead of the drive motor 15 it would be possible to use a different type of drive mechanism, for instance a hydraulic or pneumatic displacement device which acts upon the chains 14 so as to move the same in increments or steps.

Continuing, it is to be recognized that the pair of chains 14 are connected at regular intervals L by webs or struts 16 or equivalent structure and at which there are mounted curved entrainment arms 17 which extend towards the outside and partially embrace or surround the cans $d$ to $h$ and $i$, $k$, $l$, $m$. The empty cans $m$ to $v$ are initially placed upon the transporting trolleys 8 and 9 and subsequently slide upon a guide arrangement 18 (FIG. 2) leading to the drawframe 1. Guide arrangement 18 extends essentially parallel to the runs 19 of the pair of chains 14. The effective guiding surface of the guide arrangement 18 is somewhat larger than the diameter $d$ of a can and is laterally bounded by a guide rail 20. The guide rail 20 thus insures for lateral guiding of the cans while the entrainment arms 17 provide for the longitudinal guiding of such cans.

At the can output section, following the filling position 4 of the drawframe 1, there is provided a conventional can weighing device 29. Can weighing devices suitable for the purposes of the invention are well known, as exemplified for example by Japanese patent publications Nos. 46-854 and 50-7660.

Figure 3:
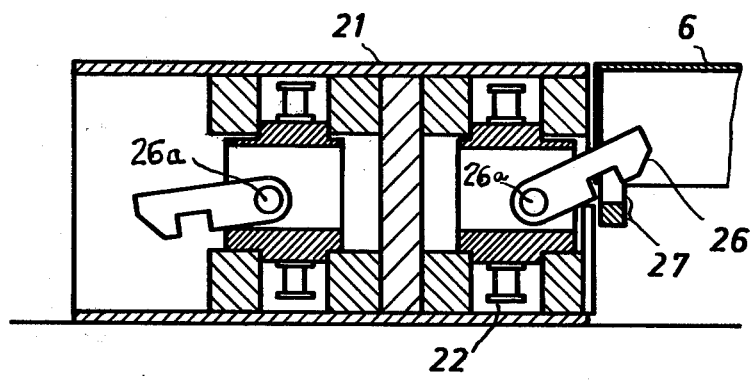
FIG. 3 is an enlarged cross-sectional view of part of the apparatus portrayed in FIG. 1, taken along the line III—III thereof.

As best seen by referring to FIG. 3, the shifting or displacement device 5 for the transporting trolleys comprises a substantially box-shaped member 21 within which a chain 22 engages with two sprocket gears or wheels 23, 24. One of the sprocket wheels, such as the sprocket wheel 23, is provided with a suitable drive motor 25 which in stepped sequences or increments moves the chain 22 through a distance corresponding to the can diameter $d$. Pawls or latches 26 which are pivotably mounted at the pivots $26a$ for upward pivotal movement are secured in spaced relationship along the chain 22 at a spacing corresponding to the width of a transport or transporting trolley, these pawls or latches 26 engaging with recesses 27 provided at the sides of the transporting trolleys 6 to 9 (FIG. 3). At the end of the shifting device 5 the pawls 26 are tilted or rocked upwardly by the action of an ascending guide or cam 28 in such a manner that the operable connection between the pawl 26 and the engaged transporting trolley is again released.

Having now had the benefit of the above discussion of the inventive apparatus for supplying spinning preparatory machines with cans, its mode of operation will be considered and is as follows:

Cans which have been emptied at a processing machine, for instance a roving frame or an open-end spinning machine, and placed upon the transporting trolleys 6 to 9 are brought to the operable zone of the shifting or displacement device 5 for the transporting trolleys. The pawls or latches 26 engage with the lateral recesses or openings 27 of the transporting trolleys as such contact the shifting device 5, and thus, guide the trolleys along the box-shaped member 21. The transporting trolleys 6 to 9 are moved stepwise or in increments forwardly in the direction of the supplying device 2. FIG. 1 illustrates the apparatus at a point in time where the transporting trolley 6 has been loaded with six full cans of a possible six cans that it can carry, the transporting trolley 7 has been loaded with two cans of a possible six cans which it can carry, and the transporting trolley 8 has had unloaded therefrom two of the six empty cans. The transporting trolley 9 still contains all six of its empty cans and the same will be subsequently unloaded when such transporting trolley 9 is shifted further along by the shifting device 5 towards the supplying device 2. The can $i$ is located at the filling section or station 4 and upon completion of the filling process is moved by the entrainment arm 17 which contacts the same onto the can weighing device 29 which was previously occupied by the can $h$. The fiber sliver which has been delivered is severed by conventional means at a location between the filling section 4 and the can $i$ as such can $i$ moves along, and the delivery of the fiber sliver proceeds continuously. The cans $d$, $e$, $f$, $g$, $h$ are each moved forward by an amount corresponding to the gauge L i.e. the distance between the entrainment arms 17 in the direction of the transporting trolley 7. After this can shifting step, the trolley 7 contains three full cans and the trolley 8 after shifting of the cans $k$, $l$, $m$ is half empty. The can $k$ is then located at the filling section or position 4 and the can $i$ at the can output section which here is combined with a weighing position i.e., the weighing device 29.

A can counter 30 activates drive 25 for the shifting or indexing of the transporting trolleys following each third can movement. Upon shifting of the transporting trolleys 6 to 9 through a distance corresponding essentially to the can diameter $d$, the cans $d$, $e$, $f$ leave the operable zone of the entrainment arms 17 and the cans n, o, p are brought into the operable zone or reach of the entrainment arms 17 arranged on the opposite chain run 19. Thus, it will be apparent that as the cans are filled they are placed upon the transporting trolleys and empty cans are continuously removed from other transporting trolleys.

The supplying apparatus of the invention which has been described above will be seen to permit continuous operation of the spinning preparatory machine i.e. the drawframe, beneficially influencing the quality of the produced fiber sliver.

The considerable reserve of empty cans which can be further enlarged in a simple manner by extending the shifting device for the transporting trolleys insures for the utmost rationalization of operator attendance when using the apparatus of this development.

A further advantage of the invention resides in the fact that in addition to the simple shifting device for the transporting trolleys, there is provided a single, simple transporting means for supplying the spinning machine e.g. drawframe with cans, for instance a chain which at preset time intervals is stepwise moved and always in the same direction. The simple movements consequently require only a very simple control mechanism, considerably improving the functional reliability of the apparatus.

While there are shown and described present preferred embodiments of the invention, it is to be distinctly understood that the invention is not limited thereto, but may be otherwise variously embodied and practiced within the scope of the following claims.

Accordingly, what is claimed is:

1. Apparatus for supplying a spinning preparatory machine with sliver cans, comprising transporting dollies for supporting and transporting the cans, an endless revolving can transporting means having a plurality of substantially equally spaced can entrainment members for engaging empty sliver cans disposed upon the transporting dollies, for urging said empty cans from said transporting dollies, for moving said empty cans into said spinning preparatory machine and for moving said empty cans into said spinning preparatory machine and for moving full sliver cans from said spinning preparatory machine back onto one of said transporting dollies, means for stepwise driving said can transporting means along a path of travel, dolly shifting means arranged transversely of and beneath the path of travel of the can transporting means for successively individually engaging ones of said transporting dollies, moving said transporting dollies to said can transporting means, across the path of travel thereof and into a position for receiving said full sliver cans from said spinning preparatory machine and means for driving said dolly shifting means in coordinated sequence with the movement of said can transporting means.

2. The apparatus as defined in claim 1, wherein said stepwise driving means for the can transporting means comprises sprocket wheels, vertical shafts for supporting said sprocket wheels, and flexible chain means trained about said sprocket wheels and disposed above the transporting dollies.

3. The apparatus as defined in claim 1, wherein said driving means for the dolly shifting means includes means for moving the dolly shifting means in a stepped sequence coordinated with the stepped movements of the can transporting means.

4. The apparatus as defined in claim 3, wherein the can transporting means includes a can filling section and a can output section, a can weighing device cooperating with the can output section and arranged after the can filling section.

* * * * *